(12) United States Patent
Keller et al.

(10) Patent No.: US 12,256,836 B2
(45) Date of Patent: Mar. 25, 2025

(54) FURNITURE KIT

(71) Applicant: VITRA AG, Birsfelden (CH)

(72) Inventors: Stefan Keller, Steinen-Hofen (DE);
Helmut Schütt, Mülllheim-Hügelheim (DE)

(73) Assignee: VITRA AG, Birsfelden (CH)

( * ) Notice: Subject to any disclaimer, the term of this patent is extended or adjusted under 35 U.S.C. 154(b) by 204 days.

(21) Appl. No.: 17/779,631

(22) PCT Filed: Nov. 25, 2020

(86) PCT No.: PCT/EP2020/083337
§ 371 (c)(1),
(2) Date: May 25, 2022

(87) PCT Pub. No.: WO2021/105197
PCT Pub. Date: Jun. 3, 2021

(65) Prior Publication Data
US 2022/0408915 A1 Dec. 29, 2022

(30) Foreign Application Priority Data
Nov. 25, 2019 (CH) .................................... 01484/19

(51) Int. Cl.
*A47B 47/00* (2006.01)
*A47B 57/38* (2006.01)
(Continued)

(52) U.S. Cl.
CPC .......... *A47B 47/0091* (2013.01); *A47B 57/38* (2013.01); *F16B 7/04* (2013.01); *F16B 12/10* (2013.01)

(58) Field of Classification Search
CPC . A47B 47/009; A47B 47/00581; A47B 57/38; A47B 87/0207; A47B 87/001; F16B 7/04; F16B 12/10; F16B 2/185
(Continued)

(56) References Cited

U.S. PATENT DOCUMENTS

| 2,665,950 A | 1/1954 | Johnson |
| 3,011,586 A * | 12/1961 | Harvey, Jr. ........... E04H 12/185 |
| | | 182/180.1 |

(Continued)

FOREIGN PATENT DOCUMENTS

| EP | 0262090 A1 | 3/1988 |
| FR | 2984430 A1 | 6/2013 |

OTHER PUBLICATIONS

International Search Report and Written Opinion issued Jan. 25, 2021 in Intl Appl. No. PCT/EP2020/083337.

*Primary Examiner* — Janet M Wilkens
(74) *Attorney, Agent, or Firm* — MEDLER FERRO WOODHOUSE & MILLS PLLC

(57) ABSTRACT

A furniture kit is disclosed that includes a set each of floor ladders, longitudinal cross-bars, and longitudinal wind braces. Each of the floor ladders has two vertical supports connected via upper and lower rungs, each of the two vertical supports is equipped with a foot for placement on a floor. Each longitudinal end of the cross-bars is equipped with a latching claw mountable, without tools, on a floor ladder rung. Each of the wind braces is equipped at its longitudinal ends with a clamp designed to be mounted on a rung of a floor ladder by gripping the rung. Cross-bars and wind braces are designed such that a cross-bars can be mounted on upper rungs of first and second floor ladders, while one of the wind braces is mounted on the upper of the first of the floor ladders and the lower of the second of the floor ladders.

23 Claims, 8 Drawing Sheets

(51) Int. Cl.
*F16B 7/04* (2006.01)
*F16B 12/10* (2006.01)

(58) Field of Classification Search
USPC ...... 312/111, 140, 265.1–265.6; 108/157.17, 108/157.13; 182/119, 118, 152; 211/191, 181.1, 180, 186, 183
See application file for complete search history.

(56) References Cited

U.S. PATENT DOCUMENTS

| | | | | |
|---|---|---|---|---|
| 3,108,657 | A * | 10/1963 | Carlson | E04G 1/24 |
| | | | | 182/180.1 |
| 3,690,407 | A * | 9/1972 | Eugene | E04G 1/152 |
| | | | | 182/178.4 |
| 3,734,033 | A * | 5/1973 | Downing | A47B 47/00 |
| | | | | 108/190 |
| 3,765,509 | A * | 10/1973 | Taylor | E04G 5/08 |
| | | | | 182/119 |
| 4,648,484 | A * | 3/1987 | Lovering | E04G 1/154 |
| | | | | 182/119 |
| 4,923,163 | A * | 5/1990 | Harley | F16B 12/20 |
| | | | | 248/300 |
| 4,967,671 | A | 11/1990 | Scherrer | |
| 5,983,420 | A * | 11/1999 | Tilley | A47B 13/02 |
| | | | | 5/2.1 |
| 6,305,868 | B1 * | 10/2001 | Kinoshita | E04G 7/305 |
| | | | | 52/655.1 |
| 6,817,478 | B2 * | 11/2004 | Venegas, Jr. | A47B 83/001 |
| | | | | 211/186 |
| 11,882,931 | B1 * | 1/2024 | Arnall | A47B 45/00 |
| 11,918,109 | B2 * | 3/2024 | Keller | A47B 87/001 |

* cited by examiner

FURNITURE KIT

TECHNICAL FIELD

The invention relates to a furniture kit by means of which furniture can be flexibly assembled, disassembled and reassembled.

BACKGROUND

In order to flexibly assemble furniture, systems are known in which furniture can be variably constructed from basic components. Variable modular furniture systems are widespread in particular in goods stores or in offices, where the furniture or the requirements for the furniture typically change from time to time.

Known variable furniture construction systems are often based on a three-dimensional supporting tube structure that can be constructed in various ways. For example, a furniture structure is described in EP 0 262 090 A1 which has a plurality of tubes that can be connected via node elements. In this system, the tubes can be assembled in various ways by means of the node elements, and in particular frames can be created in different shapes. The connected tubes can also be equipped with screens and shelves that are mounted between the tubes.

In modern office landscapes, among other things, there is an increasing need to frequently and comprehensively adjust the furniture. Despite their variability, known modular furniture systems are disadvantageous because they have to be dismantled and reassembled in a complex manner. This reassembly is typically carried out by trained persons using special tools. This is necessary for safety reasons, among other things, since the furniture construction system must ensure that the furniture created therewith is sufficiently stable. Unstable furniture can pose a significant risk to people, in particular in the case of comparatively high and/or heavily loaded furniture.

Since, with the known furniture construction systems, assembling, reassembling and disassembling furniture is, as mentioned, expensive and can pose a safety risk if done improperly, nowadays it is typical to refrain from adapting the furniture to changing needs. For example, in open office landscapes, in which it might make sense to adapt the furniture on a project-by-project basis, the variability of modular furniture systems is not used.

The object of the following invention is therefore to propose a system with which furniture can be flexibly created and reassembled in a simple manner, virtually without tools, which furniture is sufficiently robust and safe that it is suitable for offices or shops, for example. In particular, the system should make it possible to assemble, reassemble and disassemble frames and work tables flexibly, efficiently and safely.

SUMMARY OF EMBODIMENTS OF THE INVENTION

The object is achieved according to the invention by a furniture kit as disclosed herein. Advantageous design variants of the invention can be found in embodiments disclosed herein.

The essence of the invention is as follows: A furniture kit comprises a set of floor ladders, a set of longitudinal cross-bars and a set of longitudinal wind braces. The furniture kit can be provided so that different pieces of furniture can be flexibly constructed from the same components as required. Such furniture can be, for example, shelves, racks or tables. In particular, the furniture can be office furniture.

The term "furniture" in the context of the invention refers to furnishings primarily in interior spaces such as homes, shops, offices or other units of use. Typically, furniture is moveable, in contrast to immovable objects (real estate) that are fixed to the ground or structures. In most cases, furniture has a predetermined purpose and is intended for a specific use. Typical furniture can be tables, chairs, shelves, racks and the like.

The term "set" in connection with the furniture kit and the floor ladders, cross-bars and wind braces thereof refers to a plurality of elements or components. For example, the set of floor ladders comprises two or more floor ladders.

The floor ladders each comprise two vertical supports connected to one another via an upper rung and a lower rung. The two vertical supports of each floor ladder are each equipped with a foot for placement on a floor. Advantageously, the floor ladders are each designed as a one-piece component.

In addition to the upper and lower rungs, the floor ladders can also comprise other rungs. These further rungs can be located above the upper rung, below the lower rung and/or between the upper and lower rungs.

Typically, the vertical supports and the rungs are substantially rod-shaped. The rungs in particular, but also the vertical supports, can have a substantially round or circular cross section. The vertical supports and the rungs of a floor ladder can each be virtually at a right angle to one another, so that the rungs extend parallel to one another and the vertical supports parallel to one another.

The vertical supports of the floor ladders can be designed over long distances as rod profiles or, for example, round or square tubes. They are typically made from a sturdy material such as metal. The vertical supports of a floor ladder advantageously extend parallel to one another.

The rungs of the floor ladders can also be designed over long distances as rod profiles or tubes. Advantageously, they have a periphery with a virtually circular cross section. The upper and lower rungs are typically horizontally oriented and extend parallel to one another when in use. The rungs are preferably made of the same material as the vertical supports.

The feet of the floor ladders can be shaped in such a way that they can be placed directly on the floor. Alternatively, they may be designed to be fitted with an element suitable for placement, such as sliders. If the furniture created from the furniture kit is to be moved frequently, rollers can also be used as the feet of the floor ladders. The feet can also be height-adjustable to allow easy alignment of a piece of furniture produced.

The longitudinal cross-bars are each equipped with a latching claw at their longitudinal ends. The latching claws are each designed to be mounted without tools on one of the rungs of one of the floor ladders. In particular, the latching claws may be designed to latch onto one of the rungs and then to be locked thereon.

The longitudinal wind braces are each equipped with a clamp at their longitudinal ends. The clamps are each designed to be mounted on one of the rungs of one of the floor ladders by gripping one of the rungs.

The cross-bars and the wind braces are designed such that one of the cross-bars can be mounted on the upper rung of a first of the floor ladders and on the upper rung of a second of the floor ladders, while one of the wind braces is mounted on the upper of the first of the floor ladders and the lower of the second of the floor ladders. Cross-bars dimensioned in this way can of course also be mounted on the lower rungs of the first and second floor ladders. Similarly, wind braces dimensioned in this way can of course also be mounted on the upper of the second of the floor ladders and the lower of the first of the floor ladders.

The components of the furniture kit are advantageously dimensioned in such a way that furniture can be assembled with comparatively few components. For example, a stable table can be assembled from two floor ladders, two cross-bars, a wind brace, and a plate element as described in more detail below.

The furniture kit according to the invention makes it possible to assemble furniture efficiently and flexibly according to the needs of the user. The users can assemble the furniture relatively easily without tools or with simple standard tools. A person skilled in the art is not required for assembly. The use of special tools can also be dispensed with.

In particular, by providing cross-bars and wind braces for connecting the floor ladders, an extremely stable construction can be achieved with simple means and using comparatively few components. For example, two floor ladders can be connected to one another at the upper or lower rungs thereof via two cross-bars and at the same time between the upper rung of one floor ladder and the lower rung of the other floor ladder via a wind brace. The cross-bars are thus aligned horizontally and the wind brace diagonally or at an angle. In this way, the combination of ground ladders, cross-bars and wind brace is fixed and stabilized in all directions in space. This can ensure a safe construction, which can also be provided for a comparatively high load.

By equipping the cross-bars with the latching claws, it is possible for the cross-bars to be easily and securely connected to the rungs. For example, they can be pushed onto the rungs from above and latch onto the rungs in such a way that said rungs are partially encompassed.

By equipping the wind braces with the clamps, the rungs can be encompassed. The rungs can thus be held firmly by the wind brace even when the wind brace is oriented at an angle. This can reliably prevent twisting of the two floor ladders. For safety reasons, the clamps can be designed in such a way that they can only be opened with a key or a simple tool such as a screwdriver. This can prevent the clamps from being opened inadvertently.

A piece of furniture constructed from the furniture kit according to the invention can also be efficiently disassembled and reassembled. For example, further floor ladders having cross-bars and wind braces can be attached to existing structures in a simple manner. In this way, a piece of furniture can be expanded as required. Similarly, it is also possible to dismantle or disassemble the furniture efficiently and safely.

The furniture kit according to the invention thus makes it possible to flexibly create and reassemble furniture in a simple manner, virtually without tools. The furniture can be robust and sufficiently safe that it is suitable for offices or shops, for example. In particular, the furniture kit makes it possible to assemble, reassemble and disassemble frames and work tables flexibly, efficiently and safely.

The cross-bars may be elongate so as to extend between two rungs of equal height of the first of the floor ladders and of the second of the floor ladders when mounted thereon. The cross-bars preferably each have a rod portion which is shaped in such a way that the latching claws of the cross-bars can be mounted thereon without tools. The rod portion can be designed as a rod profile or, for example, a round or square tube. The rod portions of the cross-bars advantageously have substantially the same shape or the same cross section as the rungs of the floor ladders. The latching claws can be mounted on the rungs of the floor ladders as well as on the cross-bars. In this way, furniture can be constructed which has structures or portions which are at a right angle to one another or which extend at a right angle to one another.

Preferably, the latching claws are each equipped with a rung receptacle, shaped to correspond to the rungs of the floor ladders, and a slide, the slide being spring-mounted on the rung receptacle and having an actuating surface. The actuating surface can be inclined with respect to a snapping or pushing direction of the latching claw, so that when it is pushed it moves the slide against the spring force and thus opens the latching claw. With such a spring-loaded slide, the latching claws can be efficiently designed to snap onto the rungs and optionally cross-bars. In this way, the cross-bars can be easily and securely assembled. In order to release the cross-bars from the rungs or cross-bars, the slide is then moved again manually, for example, so that the rung receptacle can be released again.

The spacings between the rungs are advantageously adapted to the intended use of the piece of furniture constructed from the furniture kit. In office environments, for example, the spacing between the rungs can be dimensioned in such a way that there is space for a folder between the rungs. The lower rungs of the floor ladders or the upper rungs of the floor ladders are preferably at a sitting table height when the floor ladders are placed with their feet on the floor. In this context, the term "sitting table height" is understood to mean the height of a tabletop of a table at which people sit, for example, to work. The sitting height of the table can range from approximately 60 cm to approximately 90 cm, and more preferably from approximately 63 cm to approximately 76 cm. Since the thickness of the tabletop that rests on the lower rungs can increase the effective height of the worktop surface or tabletop surface, the sitting table height of the lower rungs can also be lower by the thickness of the tabletop.

Such dimensioning of the floor ladders allows a table for sitting to be provided in an efficient manner by laying a plate element as a tabletop on the cross-bars which connect the lower rungs of two floor ladders. The plate element can be designed in particular as explained further below.

Similarly, the top rungs of the floor ladders are preferably at a standing table height when the floor ladders are placed with their feet on the floor. In this context, the term "standing table height" is understood to mean the height of a tabletop of a table at which people stand, for example, to work. The standing height of the table can range from approximately 85 cm to approximately 125 cm, and more preferably from approximately 96 cm to approximately 107 cm. Since the thickness of the tabletop that rests on the upper rungs slightly increases the effective height of the worktop surface or tabletop surface, the standing table height of the upper rungs can be lower by the thickness of the tabletop.

The feet of the floor ladders are preferably height-adjustable. Such height-adjustable feet make it possible to compensate for unevenness, so that stable standing can be guaranteed.

The furniture kit preferably comprises a set of assembly ladders, each of which has two vertical supports connected to one another via an upper rung and a lower rung, the vertical supports being designed to be pushed onto the vertical supports of another of the assembly ladders or the vertical supports of one of the floor ladders. With such assembly ladders, the height of the furniture can be designed as required. In particular, the piece of furniture can be designed to be flexible in height in order to be dimensioned as required.

The spacings between the rungs can also be the same for all floor and assembly ladders and, as mentioned, can be approximately the height of a folder. As a result, a frame or a similar piece of furniture that can be used in an office can be efficiently constructed using the furniture kit.

The upper ends of the vertical supports of the last assembly ladder or the floor ladder can be closed with a cover. Such covers allow an improved appearance of the furniture assembled from the furniture kit.

Preferably, at least one of the cross-bars has two longitudinal rod portions connected to one another via transverse struts, with the two rod portions being equipped with the latching claws at their longitudinal ends, so that at least one of the cross-bars can be mounted simultaneously both on the upper rung of the first floor ladder and on the upper rung of the second floor ladder and also on the lower rung of the first of the floor ladders and on the lower rung of the second of the floor ladders. With such a double cross-bar, a particularly stable connection of the two floor ladders or two assembly ladders can be achieved. As a result, larger spacings between the floor or assembly ladders can also be implemented in a stable manner.

The furniture kit preferably comprises a set of panels, each of which can be arranged between two adjacent rungs of one of the floor ladders or between two vertically adjacent, parallel cross-bars such that there is a spacing from the two adjacent rungs or the two vertically adjacent, parallel cross-bars. The panels can also be arranged between two adjacent rungs of an assembly ladder. Such panels can be used to form a piece of furniture which has virtually closed vertical surfaces. This can serve as a privacy screen and/or create a more physical appearance. In addition, such panels can serve as noise protection.

The panels are preferably dimensioned such that the spacing from the two adjacent rungs of the floor ladder or the vertically adjacent, parallel cross-bars is dimensioned in each case in such a way that the latching claws of the cross-bars can be mounted on the two adjacent rungs vertically adjacent, parallel cross-bars. Such cross-bars allow the furniture to be further disassembled or reassembled if it is already equipped with panels. In particular, the spacing allows additional cross-bars to be mounted on the rungs and detached therefrom, despite the built-in panels.

Each of the panels preferably comprises two covers. Such panels formed from covers can allow a simple construction of the panels. For example, the two covers can be designed as two perforated or unperforated metal sheets that are connected to one another in such a way that there is a cavity between the metal sheets. Such a cavity can be used, for example, for arranging further elements of the panel. Alternatively, it can assume a soundproofing function.

Preferably, the set of panels comprises a plurality of fastening pieces which are designed to fasten the panels to two parallel cross-bars or to two parallel rungs in such a way that the panels lie in a plane encompassing an axis of two adjacent vertical supports. In this context, the term "lying in a plane" can refer to the fact that one of the panels lies in the plane at its front or rear side or in particular that the plane extends between the front and rear sides parallel thereto. Because the fastening pieces allow the panels to lie in one plane with the vertical supports, a comparatively smooth and even appearance of the piece of furniture can be created.

In this case, the plurality of fastening pieces comprises first fastening pieces which are designed such that the panels are offset to a plane formed by the two parallel cross-bars when said panels are fastened to the two parallel cross-bars, and second fastening pieces which are designed such that the panels lie in a plane formed by the two parallel rungs when said panels are fastened to the two parallel rungs. Because the cross-bars typically do not lie in a plane formed by two vertical supports, but are offset thereto, different fastening pieces allow the panels to lie between two vertical posts irrespective of whether they are mounted on rungs or on cross-bars.

Preferably, the covers each have a rail, and the covers and the fastening pieces are designed such that the rails of the two covers of each of the panels together accommodate one of the fastening pieces and the two covers of each of the panels are thereby fastened to one another. Advantageously, the covers are each equipped with several rails. For example, they can be equipped with four rails for stable fastening to the rungs or cross-bars. Such rails allow the fastening pieces to be mounted efficiently on the covers and at the same time the covers are joined together so that two covers form one part together with the rails and the fastening pieces.

Preferably, the fastening pieces are each equipped with a bolt that can be set in a locked position and an unlocked position, the rails of the covers each comprise a bolt receptacle and the bolts each lock the associated fastening piece to the rails of the two covers in which the fastening piece is accommodated when the latch is in the locked position. Such locking structures allow efficient assembly of the panels that is ready-made or adapted to the intended use. For example, when assembling or reassembling the piece of furniture, the panels can be designed in such a way that they fit their intended purpose.

Preferably, the furniture kit comprises a plate element which is designed to rest on two parallel cross-bars when the two parallel cross-bars are mounted on the first of the floor ladders and the second of the floor ladders, there being a spacing between the plate element and the rungs of the first of the floor ladders and the second of the floor ladders on which the two parallel cross-bars are mounted. The plate element can be a tabletop, a shelf or similar. Shelves or racks and tables can be efficiently constructed with such plate elements.

The plate element is preferably dimensioned such that the spacing from the rungs of the first of the floor ladders and the second of the floor ladders is dimensioned in such a way that the latching claws of the cross-bars can be mounted on the two adjacent rungs. By providing the spacing between the rungs and the plate element in this way, cross-bars can continue to be mounted on and removed from the rungs even when the plate element is present.

In order to ensure mounting and removal of the cross-bars or to ensure that the latching claws thereof are accessible, the spacing is preferably in a range of from approximately 5 mm to approximately 20 mm, in a range of from 8 mm to approximately 15 mm and in particular in a range of from approximately 10 mm to approximately 13 mm. In embodiments of the furniture kit in which both panels and plate elements are present, all the spacings involved may be within the specified range. In particular, all spacings can uniformly correspond to the same spacing. Such a design allows the latching claws to be mounted and removed at all possible points of the furniture without affecting already existing parts of the furniture.

The plate element is preferably equipped with at least two rests, each of which partially grips one of two parallel cross-bars when the plate element rests on the two parallel cross-bars. Such rests allow a stable arrangement of the plate element on the cross-bars. In particular, lateral slipping of the plate element can be avoided.

Advantageously, several rests per cross-bar are provided on the plate element. For example, the plates can be equipped with four or six rests, so that each of the two cross-bars is assigned two or three rests. In this way, the plate element can be placed on the cross-bars in a stable manner.

The rests can be provided with a band or a similar structure with which the cross-bars can be fixed to the rests. In this way, the plate element can be secured to the cross-bars.

Preferably, the at least two rests of the plate element each have a first plug-in part and the cross-bars each have a second plug-in part which are designed in such a way that the first and second plug-in parts engage in one another when the plate element rests on the two parallel cross-bars. In this way, the plate element can be precisely aligned or positioned on the cross-bars. Among other things, this allows the spacing to be precisely defined. For example, the spacing can be kept comparatively small in this way so that virtually no deviations are possible when positioning the plate element on the cross-bars.

The first and second plug-in parts can be provided in different ways on the rests and the cross-bars. For example, the first plug-in part can be a pin formed on the rest as a male plug-in part and the second plug-in part can be a borehole as a female plug-in part in the cross-bar. It is also possible that the cross-bar is equipped with male plug-in parts and the rests with female plug-in parts.

BRIEF DESCRIPTION OF THE DRAWINGS

Further advantageous designs of the invention can be found in the following description of embodiments of the invention with reference to the schematic drawings. In particular, the furniture kit according to the invention is described in detail below with reference to the accompanying drawings on the basis of embodiments.

DETAILED DESCRIPTION OF EMBODIMENT(S) OF THE INVENTION

Figure 1:
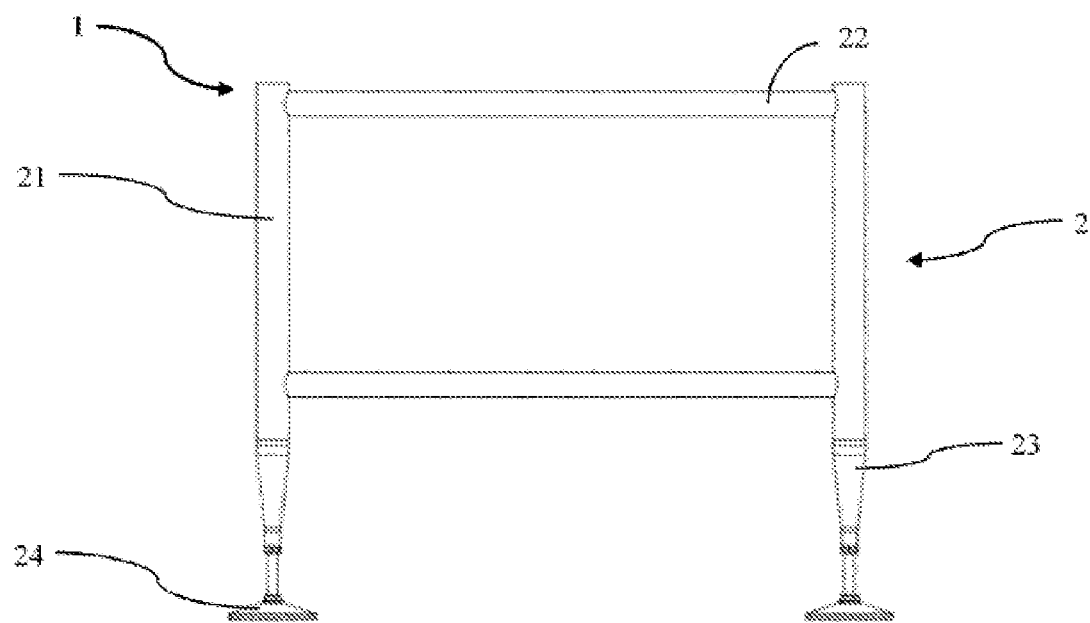
FIG. 1 is a front view of a floor ladder of a first embodiment of a furniture kit according to the invention.

Certain terms are used in the following description for practical reasons and are not intended to be limiting. The words "right," "left," "below" and "above" indicate directions in the drawing to which reference is made. The terms "inward," "outward," "below," "above," "left," "right" or similar are used to describe the arrangement of designated parts relative to each other, the movement of designated parts relative to each other and the directions toward or away from the geometric center of the invention and designated parts thereof as shown in the drawings. This spatial relative information also includes different positions and orientations from those shown in the drawings. For example, if a part shown in the drawings is reversed, elements or features that are described as "below" are then "above." The terminology includes the words expressly mentioned above, derivatives thereof, and words of similar meaning.

In order to avoid repetitions in the drawings and the associated description of the different aspects and embodiments, certain features are to be understood as common for different aspects and embodiments. The omission of an aspect in the description or a drawing does not suggest that this aspect is missing in the associated embodiment. Rather, such omission can serve for clarity and preventing repetitions. In this context, the following specification applies to the entire further description: If reference signs are included in a drawing for the sake of clarity of the drawing, but are not mentioned in the directly associated description text, reference is made to the explanation thereof in the preceding description of the drawings. If reference signs are also mentioned in the description text belonging directly to a drawing which are not contained in the associated drawing, reference is made to the preceding and following drawings. Similar reference signs in two or more drawings represent similar or identical elements.

FIG. 1 shows a floor ladder 2 of a set of floor ladders 2 of a first embodiment of a furniture kit 1 according to the invention. The floor ladder 2 consists of two parallel vertical supports 21 which are connected to one another by two horizontal rungs 22. The rungs 22 are designed as straight tubes having a circular cross section. They are at right angles to the vertical supports 21 and are rigidly connected thereto, for example welded. The vertical supports 21 are also largely designed as straight tubes having a circular cross section and each merge downward into a tapering foot 23. The two feet 23 are each equipped with a slider 24 which is arranged on the floor for placement of the floor ladder 2.

Figure 2:
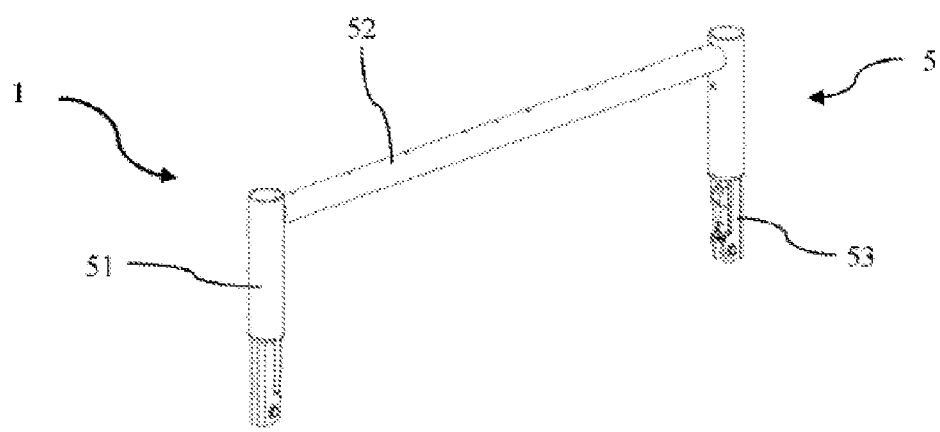
FIG. 2 is a front view of an assembly ladder of the furniture kit of FIG. 1.

FIG. 2 shows a single-rung assembly ladder 5 of a set of assembly ladders 5 of the furniture kit 1. The assembly ladder 5 comprises two tubular vertical supports 51 which are rigidly connected to one another via a tubular rung 52. Together, the vertical supports 51 and the rung 52 are virtually U-shaped. The rungs 52 of the assembly ladder have the same dimensions as the rungs 22 of the floor ladder 2 of FIG. 1, so that the assembly ladder 5 matches the floor ladder 2.

From the lower ends of the vertical supports 51 of the assembly ladder 5, a tube connector 23 extends vertically downward. The tube connectors 23 are designed in such a way that they can be inserted into the vertical supports 21 of the floor ladder 2 or into vertical supports 51 of a further assembly ladder 5 and fix the connected vertical supports 21, 51 to one another by actuation.

In addition to the assembly ladder 5, as shown in FIG. 2, the set of assembly ladders 5 of the furniture kit 1 comprises further assembly ladders having vertical supports connected via two parallel rungs. In comparison to the single-rung embodiment of FIG. 2, these assembly ladders are designed to be longer or higher.

Figure 3:
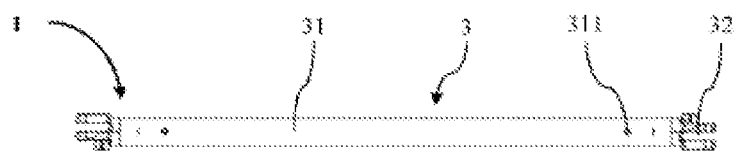
FIG. 3 is a top view of a cross-bar of the furniture kit of FIG. 1.

FIG. 3 shows a cross-bar 3 of a set of cross-bars 3 of the furniture kit 1. The cross-bar 3 is formed from an elongate rod portion 31 and latching claws 32 extending outward from the longitudinal ends of the rod portion on the left and right. The rod portion 31 is formed from a tube having a circular diameter corresponding to the diameter of the rungs 52 of the assembly ladder 5 and the rungs 22 of the floor ladder 2. On its upper side, the rod portion 31 is equipped near each of its longitudinal ends with a bore 311 as a female plug-in part.

Figure 4:
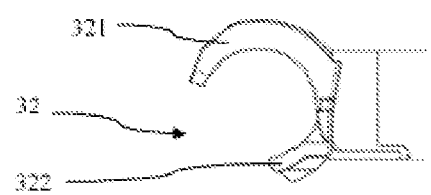
FIG. 4 is a side view of a latching claw of the cross-bar of FIG. 3.

In FIG. 4, the left of the two latching claws 32 of the cross-bar 3 of FIG. 3 is shown enlarged. It can be seen that the latching claw 32 has an upper rung receptacle 321 shaped to match the rungs 22, 52 of the floor and assembly ladders 2, 5 and a lower slide 322. The latching claw 32 is equipped with a spring which pushes the slide 322 to the left into the position shown in FIG. 4. In this position, the latching claw 32 is latched onto a rung 22, 52 or a rod portion 31 of another cross-bar 3 when the rung receptacle 321 accommodates said rung or portion. The cross-bar 3 is then mounted on the rung 22, 52 or the rod portion 31.

In order to release the latching claw 32, the slide 322 is pushed to the right, for example manually, counter to the spring force. As a result, the latching claw 32 is opened and the cross-bar 3 can be removed. In order to mount the cross-bar 3 on a rung 22, 52 or on a rod portion 31 of another cross-bar 3, the latching claw 32 is pushed onto the rung 22, 52 or the rod portion 31 from above. The slanted underside, designed as an actuating surface, of the slide 322 pushes said slide to the right so that the rung receptacle 321 can accommodate the rung 22, 52 or the rod portion 31. Driven by the spring, the slide 322 then snaps in again below the rung 22, 52 or the rod portion 31, thus achieving secure fastening.

Figure 5:
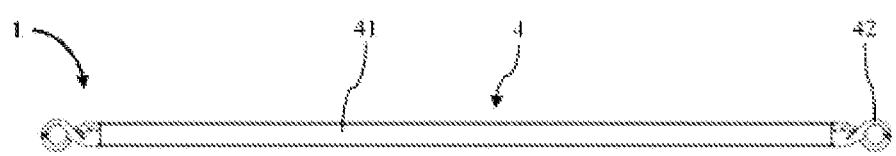
FIG. 5 is a front view of a wind brace of the furniture kit of FIG. 1.
Figure 6:
FIG. 6 is a top view of the wind brace of FIG. 5.

FIG. 5 shows a wind brace 4 of a set of wind braces 4 of the furniture kit 1. The wind brace 4 has a rod portion 41 which merges into a clamp 42 at each of its longitudinal ends. As can be seen in combination with FIG. 6, the rod portion 41 is designed as a solid square rod with a rectangular cross section. Due to the solid design, the wind brace can be particularly robust and designed to absorb comparatively large forces.

Figure 7:
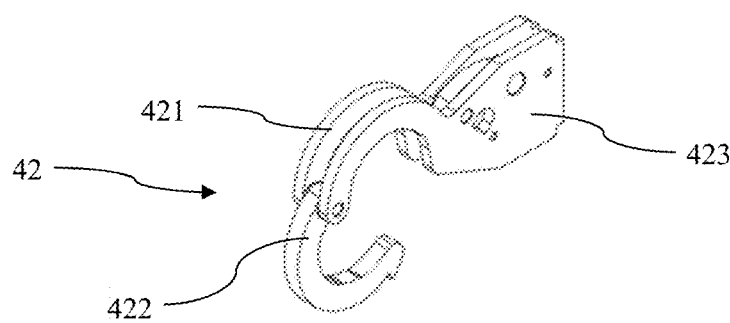
FIG. 7 is a perspective view of a clamp of the wind brace of FIG. 5.

FIG. 7 shows one of the clamps 42 of the wind brace 4 in an open position. The clamp 42 is provided with a base 423, an upper gripping part 421 and a lower gripping part 422 in the manner of a handcuff. The lower gripping part 422 is pivotally mounted on the upper gripping part 421 via a hinge joint. A locking mechanism is located in the base 423 which fixes the lower gripping part 422 when the clamp 42 is closed so that it grips a rung 22, 52. In particular, the lower gripping part 422 is equipped with a detent that engages behind a spring-loaded bolt of the locking mechanism. The rung 22, 52 is thus held firmly and loosening of the clamp 42 without actuation of the locking mechanism can be avoided.

Figure 8:
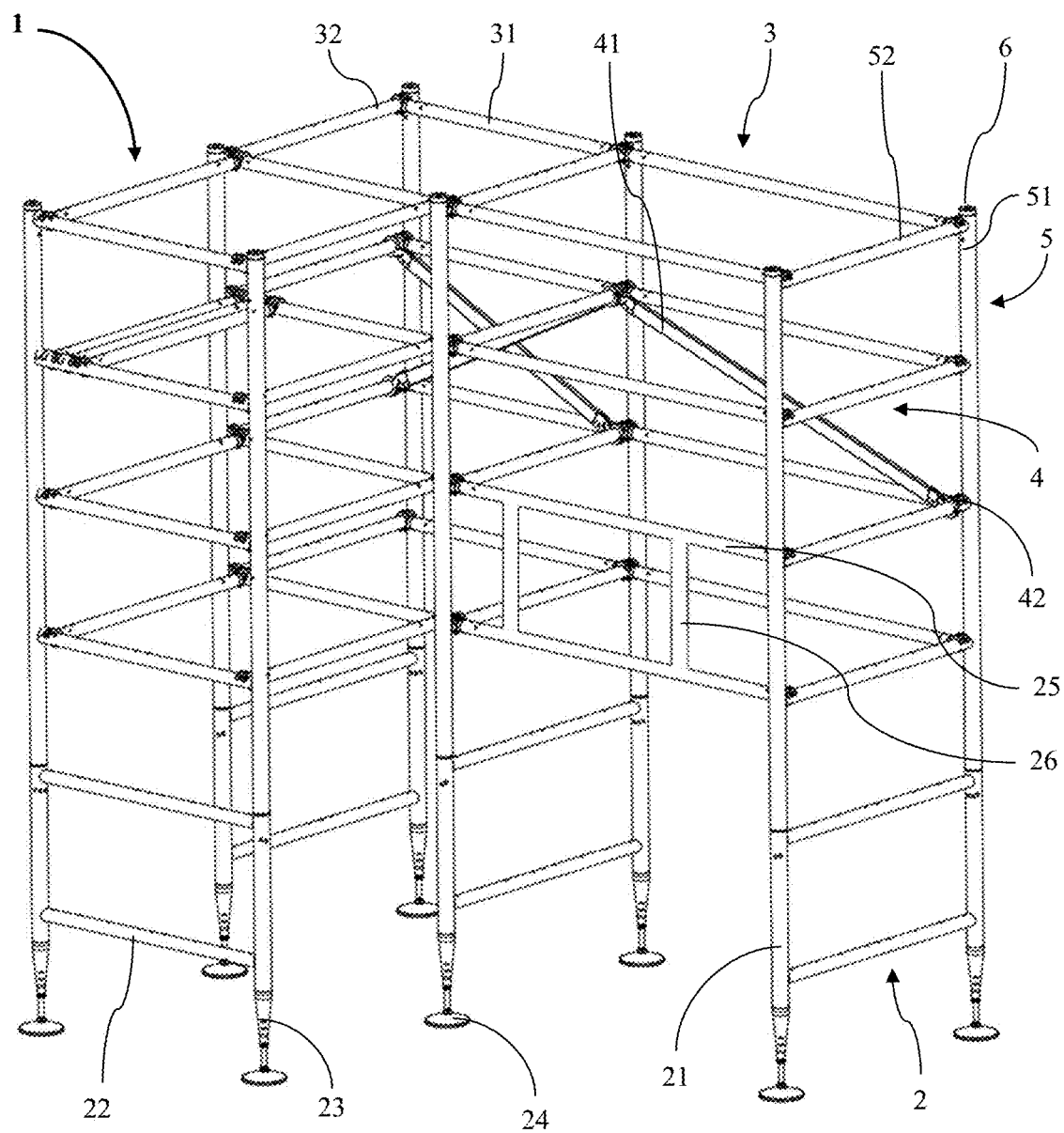
FIG. 8 is a perspective view of a frame construction assembled from the furniture kit of FIG. 1.

FIG. 8 shows a frame construction constructed from the furniture kit 1 as a three-dimensional supporting tubular structure. The frame construction comprises four ladders, which are each formed from one floor ladder 2 and two assembly ladders 5, each with two rungs 52, placed vertically thereon. The rungs 52 of the assembly ladders 5, which are at the same height, are each connected to one another via two cross-bars 3. For this purpose, the latching claws 32 of the cross-bars 3 are mounted on the rungs 52 adjacent to the vertical supports 51 of the assembly ladders 5. At the same time, several wind braces 4 are connected diagonally or obliquely to rungs 52 at two different heights. Two longitudinal rod portions 25 are connected to one another via transverse struts 26.

By providing the cross-bars 3 together with the wind braces 4 on the ladder, the frame construction is extremely robust and rigid. In particular, it can absorb comparatively large loads in this way. The upper ends of the tube portions 51 of the uppermost assembly ladders 5 are covered with covers 6 and closed.

Figure 9:
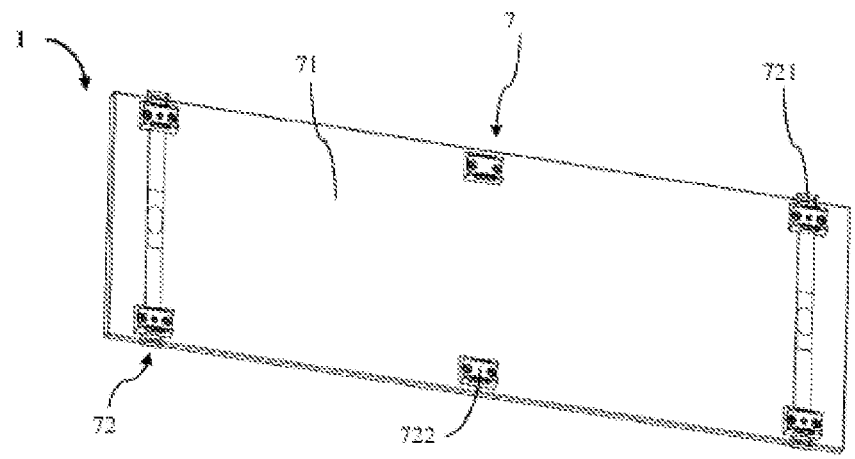
FIG. 9 is a perspective view from below of a plate element of the furniture kit of FIG. 1.

FIG. 9 shows a plate element 7 of the furniture kit 1. The plate element 7 comprises a board 71 or a plate, on the underside of which rests 72 are arranged near the longitudinal edges. In particular, the rests 72 comprise four positioning rests 721 and two supporting rests 722 in the middle therebetween.

Figure 10:
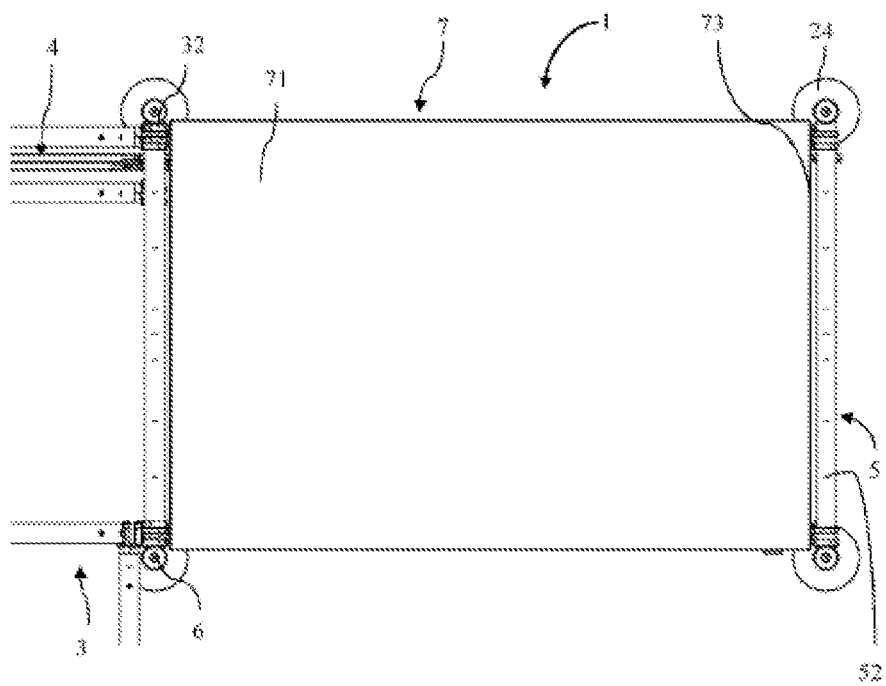
FIG. 10 is a view of the plate element of FIG. 9 mounted on the frame structure of FIG. 8.

As can be seen in FIG. 10, the plate element 7 is designed to rest on two parallel cross-bars 3 of the frame construction. In each case there is a spacing 73 between the plate element 7 and the rungs 52 on which the two parallel cross-bars 3 are mounted. The spacings 73 are uniformly dimensioned in such a way that the latching claws 32 of the cross-bars 3 can be mounted on the rungs 52 and removed therefrom.

Figure 11:
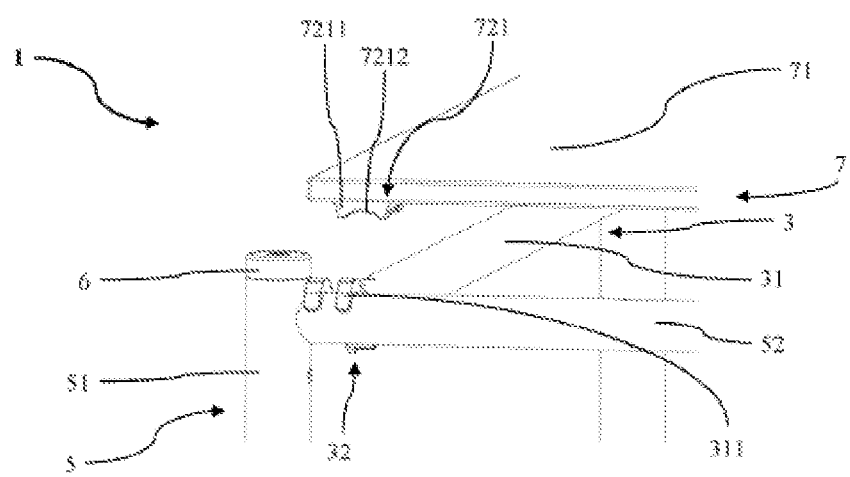
FIG. 11 is a perspective detail view of the frame construction of FIG. 8 and the plate element of FIG. 9 during assembly thereof.

In FIG. 11 the plate element 7 is shown during assembly on the frame construction. For this purpose, it is placed on the cross-bars 3. The positioning rests 721 have a gripping portion 7211 and a pin 7212 as a male plug-in part. The gripping portion 7211 is designed to partially grip the associated cross-bar 3 so that the plate element 7 is secured against horizontal displacement on the cross-bars 3. When placed on the cross-bars 3, the pins 7212 are inserted into the bores 311 so that, on the one hand, the plate element 7 is further secured against horizontal displacement and, on the other hand, the plate element 7 is positioned exactly on the cross-bars 3. As a result, the spacings 73 are precise, which is necessary for a secure mounting or removal of other cross-bars 3 on the rungs 52.

Figure 12:
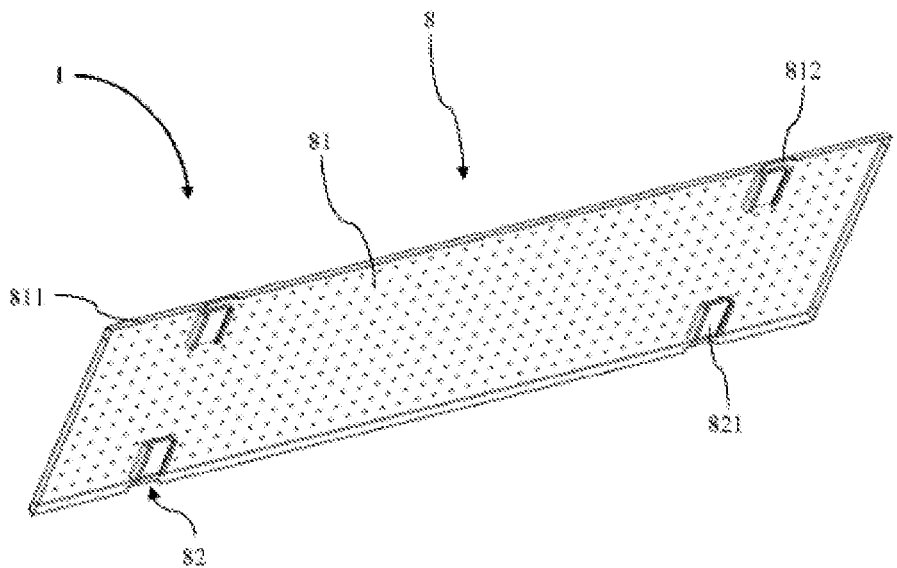
FIG. 12 is a perspective view of one of two covers of a panel of the furniture kit of FIG. 1.

FIG. 12 shows one of two covers 81 of a panel 8 of a set of panels 8 of the furniture kit 1. The cover 81 is designed as a perforated metal sheet with a bent edge 811. Near the longitudinal edge 811, the cover 81 is provided with two rails 82. The rails 82 each have a receiving socket 821. Corresponding to the rails 82, the edge 811 of the cover 81 is provided with an opening 812 through which the associated rail 82 is accessible.

Figure 13:
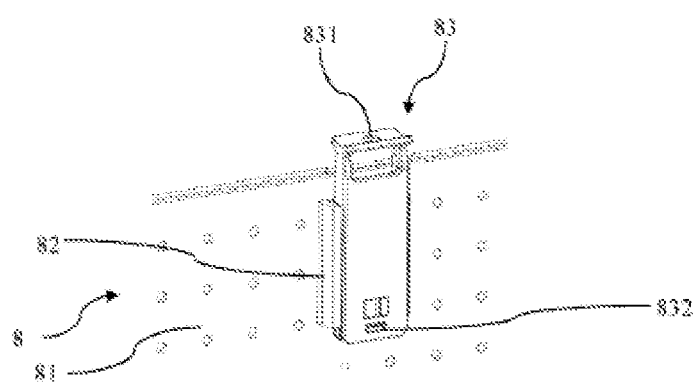
FIG. 13 is a perspective view of a fastening piece of a first variant of the panel of FIG. 12, which is arranged in a rail of the cover of FIG. 12.

FIG. 13 shows one of the rails 82 of the cover 81 with a first variant of a fastening piece 83 of the panel 8. The fastening piece 83 is straight and comprises a block portion which is inserted into the receiving socket 821 of the associated rail 82. The fastening piece 83 extends from the rail 82 through the opening 812 and out of the panel 8. Inside the fastening piece 83 is a locking mechanism which is accessible through an opening 831 with a tool such as a screwdriver. The locking mechanism comprises a bolt 832 which can protrude through a window in the block portion of the fastening piece 83 when the locking mechanism is properly adjusted.

Figure 14:
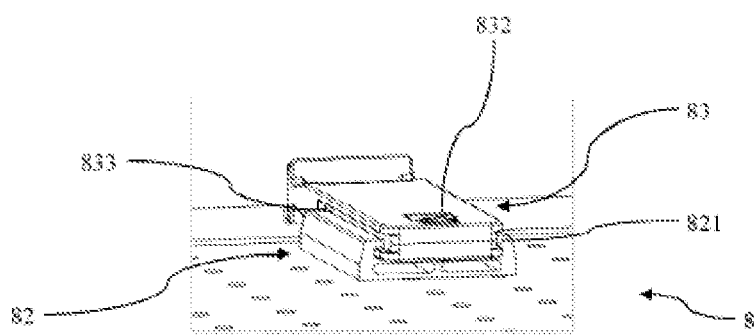
FIG. 14 is another perspective view of the fastening piece of FIG. 13.

As can be seen in the view of FIG. 14, the fastening piece 83 is equipped with a groove 833 on the two longitudinal sides of the block portion, which groove is pushed into a bent edge of the receiving socket 821 of the rail 82. In the assembled state of the panel, a second identical cover 81 is arranged, rotated by 180°, on the first cover 81 so that the fastening piece 83 is arranged in the receiving sockets 821 of corresponding two rails 82 of the two covers 81. As a result, the two covers 81 are fastened to one another in an abutting manner. In particular, the four analogous rails 82 can be used to create a stable connection between the two covers 81 and a panel consisting of one piece. In the position shown in FIG. 14, the bolts 832 protrude from the fastening pieces 83 on both sides. The fastening pieces 82 are symmetrical, so that bolts 832 protrude upward and downward from the block portions on both sides. As a result, the fastening pieces 83 are blocked on the rails 82 and the two covers 81 are secured to one another.

Figure 15:
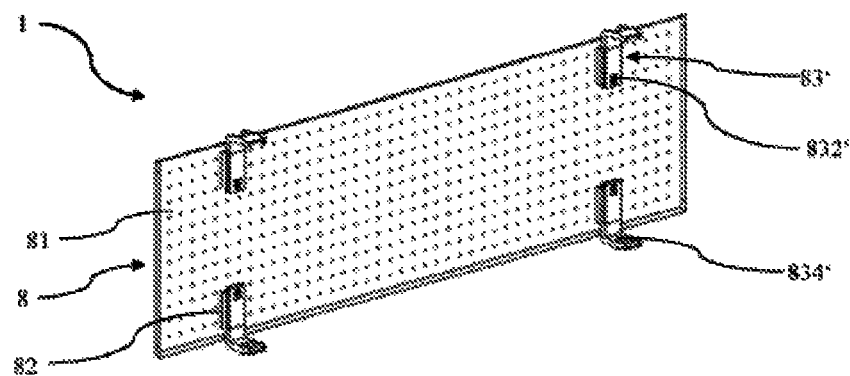
FIG. 15 is a perspective view of the cover of FIG. 12, on which fastening pieces of a second variant are arranged.

In FIG. 15, the cover 81 is equipped with a second variant of fastening pieces 83'. The fastening pieces 83' are identical to the fastening pieces 83 of the first variant over long distances. In particular, they comprise the same block portions and the same locking mechanism. In contrast to the straight fastening pieces 83, the fastening pieces 83' of the second variant are angled or rectangular in shape.

Figure 16:
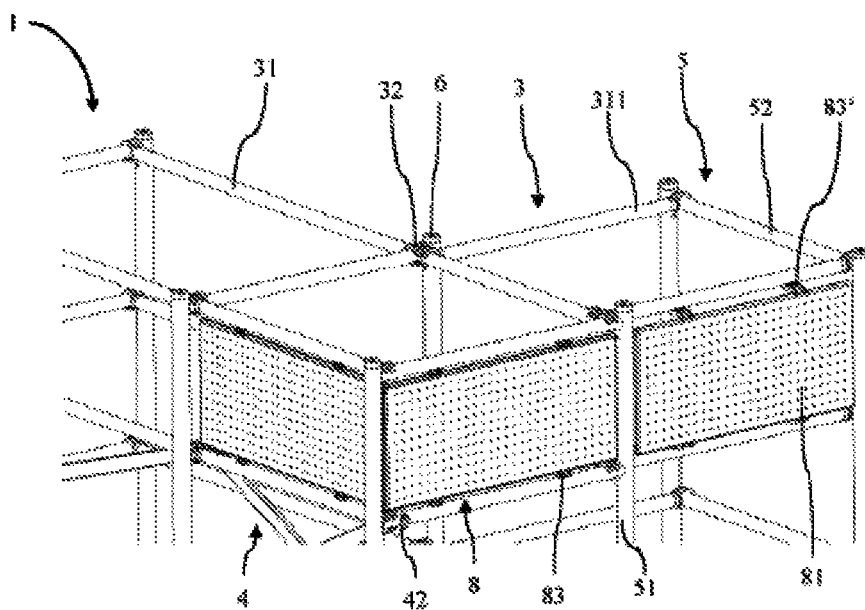
FIG. 16 is a perspective view of the frame construction of FIG. 8 with panels mounted thereon according to FIG. 13 and according to FIG. 15.
Figure 17:
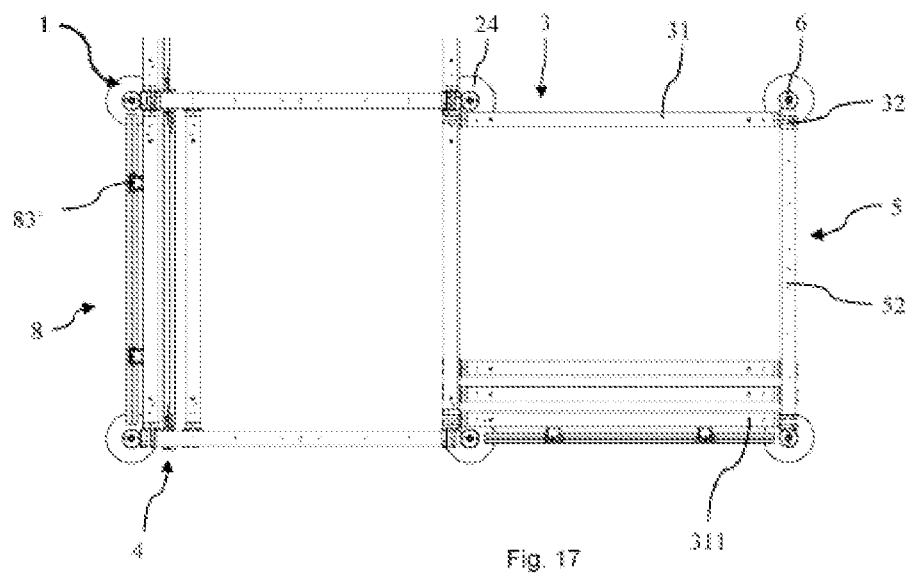
FIG. 17 is a view of the frame construction of FIG. 16.

FIG. 16 and FIG. 17 show a panel 8 with fastening pieces 83 of the first variant and two panels 8 with fastening pieces 83' of the second variant mounted on the frame construction. It can be seen that the central panel 8 having the fastening pieces 83 of the first variant is arranged between and on two adjacent rungs 52 of one of the assembly ladders 5 such that there is a spacing from the two adjacent rungs 52. The spacing is dimensioned in such a way that the rungs 52 are each accessible for the latching claws 32 of the cross-bars 3. The middle panel 8 is located between the rungs 52 and in a plane formed by the vertical supports 51 of the associated ladder 5.

The left and right panels 8 are equipped with the fastening pieces 83' of the second variant. The fastening pieces 83' are each mounted on the rod portions 31 of two vertically parallel cross members 3. As can also be seen in particular in FIG. 16, the angled shape of the fastening pieces 83' allows the panels 8 to be offset from the cross-bars 3 and in particular in a plane formed by the vertical supports 51 of the assembly ladders 5 connected by the cross-bars 3. The panels 8 can thus together form a uniform outer cover of the frame construction.

Figure 18:
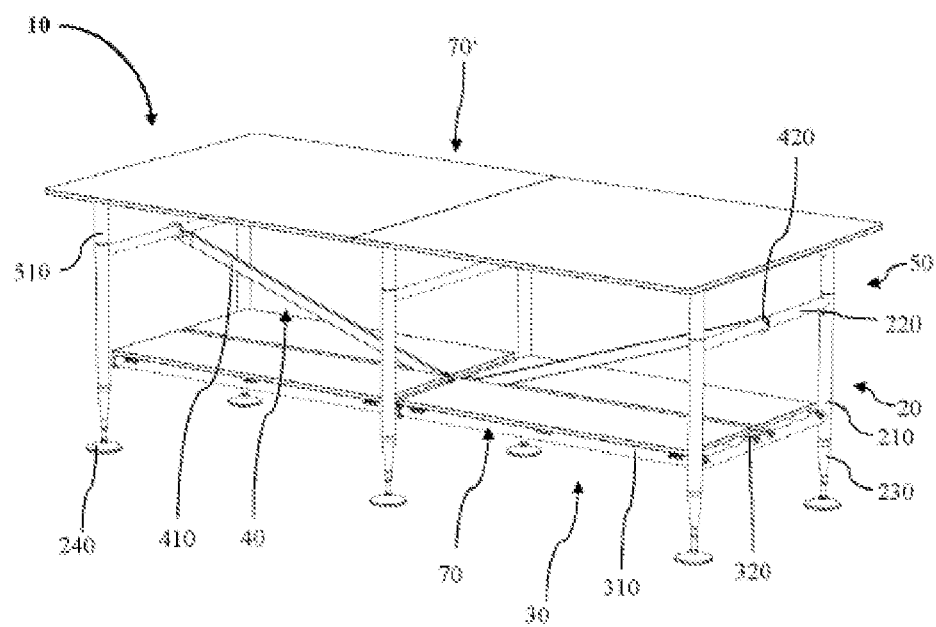
FIG. 18 is a perspective view of a piece of furniture assembled from a second embodiment of a furniture kit according to the invention.

FIG. 18 shows a work table assembled from a second embodiment of a furniture kit 10 according to the invention as a piece of furniture. The furniture kit 10 comprises three floor ladders 20 which, identically to the floor ladders 2 from FIG. 1, are equipped with two vertical supports 210 comprising parallel feet 230, two rungs 220 connecting the vertical supports 210 at a right angle, and two sliders 240. Furthermore, the furniture kit 10 has three ladders 50 each arranged on the floor ladders 20, which, identically to the single-rung ladder 5 of FIG. 2, are equipped with two parallel vertical supports 510 and one rung. In addition, the furniture kit 10 comprises sixteen cross-bars 30, two wind braces 40 and four plate elements 70, which are each designed in accordance with the cross-bars 3, wind braces 4 and plate elements 7 described above. The cross-bars 30 are equipped with rod portions 310 and latching claws 320 and the wind braces 40 are equipped with rod portions 410 and clamps 420.

A special feature of the furniture kit 10 is that it comprises two further panel elements 70' which are larger than the panel elements 70. The plate elements 70 lie on the eight upper cross-bars 30, which connect the rungs of the assembly ladders 50 to one another, and are fastened thereto. The plate elements 70' protrude beyond the assembly ladders 50 and the cross-bars 30 on all sides. As a result, they can form a comparatively generous tabletop. By means of the floor ladders 20 and the assembly ladders 50, the tabletop is arranged at a height at which it is easy to work on.

Although the invention is illustrated and described in detail by means of the drawings and the associated description, this illustration and this detailed description are to be understood as illustrative and exemplary and not as limiting the invention. In order not to transfigure the invention, in certain cases well-known structures and techniques cannot be shown and described in detail. It is understood that persons skilled in the art can make changes and modifications without departing from the scope of the following claims. In particular, the present invention covers further embodiments with any combination of features that may differ from the combinations of features explicitly described.

The present disclosure also includes embodiments with any combination of features mentioned or shown above or below for various embodiments. It also includes individual features in the drawings, even if they are shown there in connection with other features and/or are not mentioned above or below. The alternatives of embodiments and individual alternatives of the features thereof that are described in the drawings and the description can be excluded from the subject matter of the invention or from the disclosed items. The disclosure includes embodiments that only include the features described in the claims or in the embodiments and also those that include additional different features.

Furthermore, the term "comprise" and derivatives thereof do not exclude other elements or steps. Likewise, the indefinite article "a" or "an" and derivatives thereof do not exclude a plurality. The functions of a plurality of features listed in the claims can be fulfilled by a unit or a step. The mere fact that certain measures are listed in different dependent claims does not mean that a combination of those measures cannot be used advantageously. The terms "substantially," "about," "approximately" and the like in connection with a property or a value in particular also define exactly the property or exactly the value. The terms "about" and "approximately" in connection with a given numerical value or range can refer to a value or range which lies within 20%, within 10%, within 5% or within 2% of the given value or range.

What is claimed is:

1. A furniture kit comprising:
    a set of floor ladders, each having two vertical supports connected to one another via an upper rung and a lower rung, wherein the two vertical supports are each equipped with a foot for placement on a floor;
    a set of longitudinal cross-bars, each of which is equipped at its longitudinal ends with a latching claw which is designed to be mounted without tools on one of the rungs of one of the floor ladders;
    a set of longitudinal wind braces, each of which is equipped at its longitudinal ends with a clamp which is designed to be mounted on one of the rungs of one of the ground ladders by engaging entirely around the respective rung; and a plate element which is designed to rest on two parallel cross-bars when the two parallel cross-bars are mounted on the first of the floor ladders and the second of the floor ladders, so that there is a spacing between the plate element and the rungs of the first of the floor ladders and the second of the floor ladders on which the two parallel cross-bars are mounted, wherein the cross-bars and the wind braces are designed such that one of the cross-bars can be mounted on the upper rung of a first of the floor ladders and on the upper rung of a second of the floor ladders, while one of the wind braces is mounted on the upper of the first of the floor ladders and the lower of the second of the floor ladders, wherein the plate element is equipped with at least two rests, each of which partially grips one of two parallel cross-bars when the plate element rests on the two parallel cross-bars, and wherein the at least two rests of the plate element each have a first plug-in part and the cross-bars each have a second plug-in part which are designed in such a way that the first and second plug-in parts engage in one another when the plate element rests on the two parallel cross-bars.

2. The furniture kit of claim 1, wherein the plate element is dimensioned such that the spacing from the rungs of the first of the floor ladders and the second of the floor ladders is dimensioned in such a way that the latching claws of the cross-bars can be mounted on the two adjacent rungs.

3. The furniture kit of claim 1, comprising a set of panels, each of which can be arranged between two adjacent rungs of one of the floor ladders or between two vertically adjacent, parallel cross-bars such that there is a spacing from the two adjacent rungs or the two vertically adjacent, parallel cross-bars.

4. The furniture kit of claim 3, wherein the panels are dimensioned such that the spacing from the two adjacent rungs of the floor ladder or the vertically adjacent, parallel cross-bars is dimensioned in each case in such a way that the latching claws of the cross-bars can be mounted on the two adjacent rungs vertically adjacent, parallel cross-bars.

5. The furniture kit of claim 3, wherein each of the panels comprises two covers.

6. The furniture kit of claim 5, wherein the set of panels comprises a plurality of fastening pieces which are designed to fasten the panels to two parallel cross-bars or to two parallel rungs in such a way that the panels lie in a plane encompassing an axis of two adjacent vertical supports.

7. The furniture kit of claim 6, wherein the plurality of fastening pieces comprises first fastening pieces which are designed such that the panels are offset to a plane formed by the two parallel cross-bars when said panels are fastened to the two parallel cross-bars, and second fastening pieces which are designed such that the panels lie in a plane formed by the two parallel rungs when said panels are fastened to the two parallel rungs.

8. The furniture kit of claim 6, wherein
the covers each have a rail, and
the covers and the fastening pieces are designed such that the rails of the two covers of each of the panels together accommodate one of the fastening pieces and the two covers of each of the panels are thereby fastened to one another.

9. The furniture kit of claim 8, wherein
the fastening pieces are each equipped with a bolt that can be set in a locked position and an unlocked position,
the rails of the covers each have a bolt receptacle, and
the bolts each lock the associated fastening piece to the rails of the two covers in which the fastening piece is accommodated when the bolt is set in the locked position.

10. The furniture kit of claim 1, wherein the spacing is in a range of from approximately 5 mm to approximately 20 mm, in a range of from 8 mm to approximately 15 mm or in a range of from approximately 10 mm to approximately 13 mm.

11. The furniture kit of claim 1, wherein the cross-bars each have a rod portion which is shaped in such a way that the latching claws of the cross-bars can be mounted thereon without tools.

12. The furniture kit of claim 1, wherein the latching claws are each equipped with a rung receptacle, shaped to correspond to the rungs of the floor ladders, and a slide, the slide being spring-mounted on the rung receptacle and having an actuating surface.

13. The furniture kit of claim 1, wherein the lower rungs of the floor ladders or the upper rungs of the floor ladders are at a sitting table height when the floor ladders are placed with their feet on the floor.

14. The furniture kit of claim 1, wherein the upper rungs of the floor ladders are at a standing table height when the floor ladders are placed with their feet on the floor.

15. The furniture kit of claim 1, wherein the feet of the floor ladders are height-adjustable.

16. The furniture kit of claim 1, which comprises a set of assembly ladders, each of which has two vertical supports connected to one another via an upper rung and a lower rung, wherein the vertical supports are designed to be pushed onto the vertical supports of another of the assembly ladders or the vertical supports of one of the floor ladders.

17. The furniture kit of claim 1, wherein at least one of the cross-bars has two longitudinal rod portions connected to one another via transverse struts, the two rod portions being equipped with the latching claws at their longitudinal ends, so that at least one of the cross-bars can be mounted simultaneously both on the upper rung of the first floor ladder and on the upper rung of the second floor ladder and also on the lower rung of the first of the floor ladders and on the lower rung of the second of the floor ladders.

18. A furniture kit configured to be flexibly assembled, disassembled and reassembled to a furnishing, comprising:
a set of floor ladders, each having two vertical supports connected to one another via an upper rung and a lower rung, wherein the two vertical supports are each equipped with a foot for placement on a floor;
a set of longitudinal cross-bars, each of which is equipped at its longitudinal ends with a latching claw which is designed to be mounted without tools on one of the rungs of one of the floor ladders;
a set of longitudinal wind braces, each of which is equipped at its longitudinal ends with a clamp which is designed to be mounted on one of the rungs of one of the ground ladders by engaging around one of the rungs;
a set of panels, each of which can be arranged between two adjacent rungs of one of the floor ladders or between two vertically adjacent, parallel cross-bars such that there is a spacing from the two adjacent rungs or the two vertically adjacent, parallel cross-bars; and
wherein the cross-bars and the wind braces are designed such that one of the cross-bars can be mounted on the upper rung of a first of the floor ladders and on the upper rung of a second of the floor ladders, while one of the wind braces is mounted on the upper of the first of the floor ladders and the lower of the second of the floor ladders, and wherein the set of panels comprises a plurality of fastening pieces which are designed to fasten the panels to two parallel cross-bars or to two parallel rungs in such a way that the panels lie in a plane encompassing an axis of two adjacent vertical supports, and wherein the plurality of fastening pieces comprises first fastening pieces which are designed such that the panels are offset to a plane formed by the two parallel cross-bars when said panels are fastened to the two parallel cross-bars, and second fastening pieces which are designed such that the panels lie in a plane formed by the two parallel rungs when said panels are fastened to the two parallel rungs.

19. The furniture kit of claim 18, wherein the panels are dimensioned such that the spacing from the two adjacent rungs of the floor ladder or the vertically adjacent, parallel cross-bars is dimensioned in each case in such a way that the latching claws of the cross-bars can be mounted on the two adjacent rungs vertically adjacent, parallel cross-bars and/or wherein each of the panels comprises two covers.

20. The furniture kit of claim 19, wherein
the covers each have a rail and
the covers and the fastening pieces are designed such that the rails of the two covers of each of the panels together accommodate one of the fastening pieces and the two covers of each of the panels are thereby fastened to one another.

21. The furniture kit of claim 20, wherein
the fastening pieces are each equipped with a bolt that can be set in a locked position and an unlocked position,
the rails of the covers each have a bolt receptacle, and
the bolts each lock the associated fastening piece to the rails of the two covers in which the fastening piece is accommodated when the bolt is set in the locked position.

22. A furniture kit configured to be flexibly assembled, disassembled and reassembled to a furnishing, comprising:
a set of floor ladders, each having two vertical supports connected to one another via an upper rung and a lower rung, wherein the two vertical supports are each equipped with a foot for placement on a floor;
a set of longitudinal cross-bars, each of which is equipped at its longitudinal ends with a latching claw which is designed to be mounted without tools on one of the rungs of one of the floor ladders;
a set of longitudinal wind braces, each of which is equipped at its longitudinal ends with a clamp which is designed to be mounted on one of the rungs of one of the ground ladders by engaging around one of the rungs; and
a set of panels, each of which can be arranged between two adjacent rungs of one of the floor ladders or between two vertically adjacent, parallel cross-bars such that there is a spacing from the two adjacent rungs or the two vertically adjacent, parallel cross-bars, and
wherein the cross-bars and the wind braces are designed such that one of the cross-bars can be mounted on the upper rung of a first of the floor ladders and on the upper rung of a second of the floor ladders, while one of the wind braces is mounted on the upper of the first of the floor ladders and the lower of the second of the floor ladders, and
wherein the set of panels comprises a plurality of fastening pieces which are designed to fasten the panels to two parallel cross-bars or to two parallel rungs in such a way that the panels lie in a plane encompassing an axis of two adjacent vertical supports, and wherein each of the panels comprises two covers, and
wherein the covers each have a rail, and
wherein the covers and the fastening pieces are designed such that the rails of the two covers of each of the panels together accommodate one of the fastening pieces and the two covers of each of the panels are thereby fastened to one another.

23. The furniture kit of claim 22, wherein
the fastening pieces are each equipped with a bolt that can be set in a locked position and an unlocked position,
the rails of the covers each have a bolt receptacle, and
the bolts each lock the associated fastening piece to the rails of the two covers in which the fastening piece is accommodated when the bolt is set in the locked position,
a set of longitudinal wind braces, each of which is equipped at its longitudinal ends with a clamp which is designed to be mounted on one of the rungs of one of the ground ladders by engaging entirely around the respective rung,
wherein the cross-bars and the wind braces are designed such that one of the cross-bars can be mounted on the upper rung of a first of the floor ladders and on the upper rung of a second of the floor ladders, while one of the wind braces is mounted on the upper of the first of the floor ladders and the lower of the second of the floor ladders.

* * * * *